United States Patent
Schmid et al.

(10) Patent No.: US 8,695,424 B2
(45) Date of Patent: Apr. 15, 2014

(54) SENSOR DEVICE FOR DETECTING AT LEAST ONE ROTATION RATE OF A ROTATING MOTION

(75) Inventors: Bernhard Schmid, Friedberg (DE); Roland Burghardt, Frankfurt (DE); Jörg Heimel, Ingelheim (DE); Otmar Simon, Pohlheim/Holzheim (DE); Roland Hilser, Kirchheim Teck (DE)

(73) Assignee: Continental Teves AG & Co. oHG (DE)

( * ) Notice: Subject to any disclaimer, the term of this patent is extended or adjusted under 35 U.S.C. 154(b) by 320 days.

(21) Appl. No.: 12/921,630

(22) PCT Filed: Mar. 11, 2009

(86) PCT No.: PCT/EP2009/052866
§ 371 (c)(1), (2), (4) Date: Sep. 9, 2010

(87) PCT Pub. No.: WO2009/112526
PCT Pub. Date: Sep. 17, 2009

(65) Prior Publication Data
US 2012/0017676 A1 Jan. 26, 2012

(30) Foreign Application Priority Data
Mar. 11, 2008 (DE) .......................... 10 2008 013 539

(51) Int. Cl.
*G01C 19/56* (2012.01)
*G06F 19/00* (2011.01)

(52) U.S. Cl.
USPC ........ 73/504.12; 73/510; 701/29.1; 701/30.3; 701/30.6

(58) Field of Classification Search
USPC ............ 73/510, 511, 504.12, 504.14, 504.16, 73/504.02, 504.04; 701/29.1, 30.3, 30.4, 701/30.5, 30.6, 30.7, 30.9, 31.1
See application file for complete search history.

(56) References Cited

U.S. PATENT DOCUMENTS

| 4,280,188 | A | * | 7/1981 | Weinstein et al. | ............ 702/141 |
| 4,914,598 | A | * | 4/1990 | Krogmann et al. | ............ 701/11 |
| 5,935,191 | A | * | 8/1999 | Sakanashi et al. | ............ 701/500 |

(Continued)

FOREIGN PATENT DOCUMENTS

| DE | 10 2007 012163 | 10/2007 |
| WO | WO 93/05400 | 3/1993 |

OTHER PUBLICATIONS

International Search Report for PCT/EP2009/052866 issued Jul. 3, 2009.

*Primary Examiner* — Helen Kwok
(74) *Attorney, Agent, or Firm* — RatnerPrestia

(57) ABSTRACT

In order to be able to perform redundant measurements of rotation rates particularly economically, disclosed herein is a sensor device which includes a dual-axis, first rotation rate sensor element with which rotation rates of rotating motions of the sensor device about a first and a second rotation rate measurement axis can be detected, wherein the first and the second rotation rate measurement axes are oriented orthogonally in relation to one another. The sensor device is defined by the fact that the sensor device includes at least one other rotation rate sensor element with which a rotation rate of a rotating motion of the sensor device about a rotation rate measurement axis, which lies in a plane together with the first and the second rotation rate measurement axes, can be deselected.

14 Claims, 10 Drawing Sheets

(56) References Cited

U.S. PATENT DOCUMENTS

| | | | |
|---|---|---|---|
| 6,386,033 B1* | 5/2002 | Negoro | 73/504.12 |
| 6,462,530 B1 | 10/2002 | Layton | |
| 6,701,788 B2* | 3/2004 | Babala | 73/649 |
| 6,796,177 B2* | 9/2004 | Mori | 73/504.02 |
| 6,925,413 B2* | 8/2005 | Krieg et al. | 702/152 |
| 7,167,785 B2* | 1/2007 | Lohberg et al. | 701/30.4 |
| 7,168,317 B2* | 1/2007 | Chen et al. | 73/504.04 |
| 7,281,406 B2* | 10/2007 | Mase | 73/1.37 |
| 7,318,348 B2* | 1/2008 | Ogino | 73/504.14 |
| 7,461,552 B2* | 12/2008 | Acar | 73/504.04 |
| 7,814,792 B2* | 10/2010 | Tateyama et al. | 73/504.12 |
| 8,096,181 B2* | 1/2012 | Fukumoto | 73/504.12 |
| 8,155,909 B2* | 4/2012 | Schmitt | 702/93 |
| 2006/0185432 A1* | 8/2006 | Weinberg | 73/510 |
| 2010/0037690 A1 | 2/2010 | Günthner et al. | |

\* cited by examiner

SENSOR DEVICE FOR DETECTING AT LEAST ONE ROTATION RATE OF A ROTATING MOTION

CROSS REFERENCE TO RELATED APPLICATIONS

This application is the U.S. national phase application of PCT International Application No. PCT/EP2009/052866, filed Mar. 11, 2009, which claims priority to German Patent Application No. DE 10 2008 013 539.9, filed Mar. 11, 2008, the contents of such application being incorporated herein by reference.

FIELD OF THE INVENTION

The invention relates to a sensor device comprising a dual-axis, first rotation rate sensor element with which rotation rates of rotating motions of the sensor device about a first and a second rotation rate measurement axis can be detected, wherein the first and the second rotation rate measurement axes are oriented orthogonally in relation to one another.

BACKGROUND OF THE INVENTION

A particularly important field of application of rotation rate sensors is that of automobiles in which the rotation rate sensors can be used in particular for determining the motion of a vehicle. For example, in this context, the yaw rate, the rolling rate and/or the pitching rate of a vehicle can be measured. The rotation rates can be used, for example, in driver dynamics controllers to determine the driving state of the vehicle and to stabilize the vehicle when required by means of suitable intervention methods before a dangerous driving state or dangerous traffic situation occurs. Furthermore, it possible to provide that safety systems access one or more measured rotation rates in order to actuate safety means of the vehicle. For example, an imminent rollover of the vehicle can be determined on the basis of the measured rolling rate. In response, it is possible to activate, for example, rollover protection systems in order to protect the vehicle occupants.

In particular when a measured rotation rate is used in a safety-critical system of a motor vehicle, reliable determination of the rotation rate is important in order to ensure the correct functioning of the system. For this purpose, redundant measurements of the rotation rates can be performed so that the plausibility of a plurality of measured values can be determined by comparing said values.

In order to redundantly measure rotation rates, it is possible to use a plurality of independent sensor devices. However, this is economically disadvantageous since in each case the full production costs are incurred for each sensor device and the sensor devices have to be integrated separately into the motor vehicle. U.S. Pat. No. 6,462,530 B1, which is incorporated by reference, discloses a rotation rate sensor which comprises an assembly with a plurality of rotation rate sensor elements which, given a suitable arrangement, permit redundant measurements of rotation rates. As a result, the integration of the rotation rate sensor elements into a motor vehicle is simplified, and assemblies of the rotation rate sensor such as, for example, a voltage supply, can be used simultaneously by a plurality of rotation rate sensor elements.

SUMMARY OF THE INVENTION

An object of the present invention is to improve further the economic viability of a redundant measurement of rotation rates.

According to one aspect of the invention, a sensor element is proposed which comprises a dual-axis, first rotation rate sensor element with which rotation rates of rotating motions of the sensor device about a first and a second rotation rate measurement axis can be detected, wherein the first and the second rotation rate measurement axes are oriented orthogonally in relation to one another. The sensor device is defined by the fact that it comprises at least one other rotation rate sensor element with which a rotation rate of a rotation motion of the sensor device about a rotation rate measurement axis, which lies in a plane together with the first and the second rotation rate measurement axes, can be detected.

Orthogonal orientation is understood within the scope of the present invention to be an essentially orthogonal orientation which can, however, differ from precise orthogonality within a relatively small angle range owing, for example, to fabrication-related tolerances. The same applies within the scope of the invention to a parallel orientation. An arrangement in a specific plane is to be understood in the same sense. In this context, owing to small deviations, two axes or directions can be oriented in relation to one another in such a way that they do not precisely form a plane. In addition, a third axis or direction can have relatively small deviation so that it does not lie precisely in a specific plane.

One advantage of a sensor device which is configured according to an aspect of the invention consists in the fact that redundant measurements of a rotation rate can be made in relation to at least one rotation rate measurement axis. As a result, it is possible, in particular, to check the plausibility of a rotation rate measurement by means of a second rotation rate measurement in order, for example, to ensure the correct method of functioning of the sensor device. This is particularly important in particular when the sensor device is used in a motor vehicle if a detected rotation rate is used to carry out safety-related functions. In a motor vehicle, the sensor device is suitable, in particular, for detecting one or more of the rotation rates from the group comprising a yaw rate of the motor vehicle, a rolling rate of the motor vehicle and a pitching rate of the motor vehicle.

Owing to the use of a dual-axis rotation rate sensor element, the sensor device can additionally be used in a flexible way in various applications for detecting rotation rates in relation to different rotation rate measurement axes. As a result, particularly high volumes can be advantageously achieved in the fabrication of the sensor device. In addition, in the case of a dual-axis rotation rate sensor element, it is possible to use various assemblies for measuring rotation rates in relation to two rotation rate measurement axes. As a result, the economic viability of the sensor device is increased, and it may even be possible to implement the use of the sensor device in an economically viable fashion as an only single-axis rotation rate sensor.

In one embodiment, the first rotation rate sensor element comprises a sensor structure which can oscillate transversally and has a deflectable structure mass and a means for exciting the sensor structure which can oscillate transversally to oscillate along an oscillation axis, wherein the structure mass can be deflected on the basis of Coriolis forces which occur during a rotation of the sensor device about the first and the second rotation rate measurement axes, and wherein the first and the second rotation rate measurement axes are oriented orthogonally in relation to the oscillation axis. Deflection of the structure mass during a rotation of the sensor device about the first and the second rotation axes is preferably detected by means of a first and a second detection unit which are each assigned to a rotation rate measurement axis.

In this configuration, only one driven structure mass is advantageously used to detect rotation rates in relation to two rotation rate measurement axes. This permits a particularly compact overall volume of the dual-axis rotation rate sensor element which corresponds virtually to that of a single-axis rotation rate sensor element. Essentially only one detection unit is added, and is assigned to the second rotation axis. In contrast, the rotation rate sensor element requires only a single drive means for driving the structure mass, as a result of which not only a more compact design but also particularly efficient operation of the rotation rate sensor element are possible.

In contrast, a corresponding, three-axis rotation rate sensor element requires an additional driven structure mass owing to the necessary orthogonality of the drive direction and rotation rate measurement axis. This leads to a situation in which a three-axis rotation rate sensor element has at most very slight advantages in terms of economic viability-compared, for example, with a combination of a dual-axis rotation rate sensor element and a further single-axis rotation rate sensor element.

In order to check the plausibility of a rotation rate measurement, the sensor device comprises, in one embodiment, a plausibility checking device which is configured to determine a plausibility signal relating to the first rotation rate on the basis of a comparison of a first rotation rate measured by means of the first rotation rate sensor element and a second rotation rate measured by means of the further rotation rate sensor element. The value of the plausibility signal is preferably a measure of the plausibility of the measured first rotation rate. In one application, the plausibility signal can be employed in order to be able to use the measured rotation rate in accordance with its plausibility.

In one development of the sensor device, the plausibility checking device is configured to determine a rotation rate output signal in relation to a rotation rate measurement axis by means of at least a first rotation rate which is measured by means of the first rotation rate sensor element and a second rotation rate which is measured by means of the other rotation rate sensor element. In this context, a rotation rate output signal which, for example, can be used by one application as a rotation rate signal in order to carry out predefined functions is advantageously determined from a plurality of measured rotation rates, as a result of which the reliability of the signal can be improved.

One embodiment of the sensor device provides that the other rotation rate sensor element is embodied as a single-axis rotation rate sensor element with which a rotation rate of a rotating motion of the sensor device about a third rotation rate measurement axis, which is oriented parallel to the first or the second rotation rate measurement axis, can be detected. As a result, redundant measurement of the rotation rates in relation to the first or second rotation rate measurement axis is advantageously made possible. A plausibility signal relating to these rotation rates can easily be determined, for example, by means of the difference between the rotation rates.

In a further embodiment of the sensor device, there is provision that the other rotation rate sensor element is embodied as a single-axis rotation rate sensor element with which a rotation rate of a rotating motion of the sensor device about a fourth rotation rate measurement axis, which is not oriented parallel to the first or to the second rotation rate measurement axis, can be detected. By means of the rotation rate which is detected in relation to the fourth rotation rate measurement axis, it is possible to determine, by means of the plausibility checking device, plausibility signals relating to the rotation rates which are detected in relation to the first and second rotation rate measurement axes. It is therefore advantageously possible in this configuration to determine plausibility signals in relation to two rotation rates by means of just one other rotation rate. The determination of the plausibility signals is preferably based here on the fact that in this configuration the angular speed in relation to one of the rotation rate measurement axes is obtained from a linear combination of the angular speeds in relation to the two other rotation rate measurement axes.

Furthermore, one development of the sensor device is defined in that the other rotation rate sensor element, with which it is possible to detect rotation rates of rotating motions of the sensor device about two other rotation rate measurement axes which are oriented orthogonally to one another, is configured as a dual-axis rotation rate sensor element, wherein at least one of the other rotation axes is oriented parallel to the first or second rotation rate measurement axis of the first rotation rate sensor element. As a result, redundant measurements of the rotation rate can advantageously be performed in relation to a rotation rate measurement axis of the first rotation rate sensor element. Depending on the arrangement of the further rotation rate sensor element in relation to the first rotation rate sensor element, it is, furthermore, also possible to perform redundant measurements in relation to the other rotation rate measurement axis of the first rotation rate sensor element, or the sensor device can be expanded by integration of the other, dual-axis rotation rate sensor element to form a three-axis rotation rate sensor.

In the last-mentioned case, for example at least one single-axis rotation rate sensor element can be additionally provided, with which a rotation rate, with respect to a rotation rate measurement axis which is oriented parallel to one of the other specified rotation rate measurement axes, can be detected. As a result, the rotation rate can also be detected redundantly in relation to this rotation rate measurement axis in order to determine a plausibility signal.

It is equally possible for an additional single-axis rotation rate sensor element to be provided with which a rotation rate can be detected in relation to a rotation rate measurement axis which lies in a plane with the other rotation rate measurement axes but is not oriented parallel to one of the other rotation axes. For this purpose, in one configuration of the sensor device there is provision for the sensor device to comprise, in addition to the other rotation rate sensor element which is embodied with two axes, another single-axis rotation rate sensor element with which a rotation rate of a rotating motion of the sensor device about a fifth rotation rate measurement axis can be detected, wherein the fifth rotation rate measurement axis lies in a plane with a rotation rate measurement axis of the first rotation rate sensor element and with a rotation rate measurement axis of the other dual-axis rotation rate sensor element, which rotation rate measurement axes are not arranged parallel to one another, and wherein the fifth rotation rate measurement axis is not oriented parallel to one of these rotation rate measurement axes of the first or of the other rotation rate sensor element. Two of the rotation rate measurement axes lying in the plane are preferably oriented orthogonally to one another—for example the two rotation rate measurement axes of the dual-axis rotation rate sensor elements which are not oriented parallel to one another.

As a result, it is possible to use just a single additional single-axis rotation rate sensor element to determine, in particular, a plausibility signal relating to the rotation rates which are determined in relation to the rotation rate measurement axes of the two dual-axis rotation rate sensor elements, in relation to which a redundant rotation rate measurement cannot be performed by the two dual-axis rotation rate sensor elements. Accordingly, an associated configuration of the sensor device provides that the plausibility checking device is configured to determine plausibility signals relating to rotation rates which have been determined in relation to a rotation rate measurement axis lying in the plane, by means of a comparison of rotation rates which have been determined in relation to rotation rate measurement axes which lie in a plane and comprise the fifth rotation rate measurement axis. This is preferably an orthogonal rotation rate measurement axis in the plane.

In addition, one configuration of the sensor device is defined by the fact that in addition to the other dual-axis rotation rate sensor element it also comprises another dual-axis rotation rate sensor element, wherein each rotation rate measurement axis of one of the dual-axis rotation rate sensor elements contained in the sensor device is oriented parallel to another rotation rate measurement axis of another rotation rate sensor element of the sensor device. In this configuration, the sensor device advantageously comprises three dual-axis rotation rate sensor elements, wherein in each case two rotation rate measurement axes of different rotation rate sensor elements are oriented parallel to one another, with the result that redundant measurements of the rotation rates are made possible in order to determine a corresponding plausibility signal.

One development of the sensor device is characterized in that the rotation rate sensor elements which are contained are components of an integrated circuit. As a result, assemblies which contain the sensor device can easily be mounted.

According to a further aspect of the invention, an assembly is proposed which comprises a sensor device of the type described above, and a signal processing device which is configured to condition a rotation rate output signal and/or a plausibility signal in relation to at least one rotation rate measurement axis of the rotation rate sensor elements contained in the sensor device, in order to be made available outside the assembly. In particular, the signal processing device can be configured to condition a rotation rate output signal and/or a plausibility signal in such a way that it can be made available on a data bus. It is equally possible, for example, to provide that the signal processing device is configured to transmit the rotation rate output signal and/or the plausibility signal in a wireless fashion to one or more receivers.

In addition to the signal processing device, the assembly can also contain an energy supply which supplies energy to the sensor device and to the signal processing device. The energy supply can be fed from outside the assembly if the latter is connected, for example, to an energy supply network. Furthermore, an autonomous energy supply of the assembly can be provided. This makes it possible, in particular, to be able to operate the assembly even when the supply network fails, in order, for example, to be able to maintain functions which rely on the measurement signals made available by the assembly.

The sensor element can be contained as an integrated circuit in the assembly, which ensures easy assembly of the assembly from modules, wherein the sensor device constitutes one of the modules. Alternatively, it is, however, also possible to provide that the rotation rate sensor elements which are contained in the sensor device are mounted directly together with other components, in particular with the signal processing device, on a printed circuit board. As a result, fewer processing steps are necessary to fabricate the assembly.

In one embodiment, the assembly comprises at least one other sensor element which is coupled to the signal processing device and which is configured to detect a measurement variable which is different from a rotation rate, wherein the signal processing device is configured to make available an output signal relating to this measurement variable. This advantageously uses a sensor infrastructure, comprising, in particular, the signal processing device, of a plurality of sensors, as a result of which the economic viability of the assembly can be increased.

When the assembly is used in a motor vehicle, the other sensor element may be, for example, an acceleration sensor element. The acceleration sensor element may be configured, for this purpose, to detect a vehicle motion dynamic acceleration in a predefined direction and/or a relatively high acceleration in a predefined direction, such as occurs in particular in the event of collisions of the vehicle. The direction may be, for example, the longitudinal direction, transverse direction or vertical direction of the vehicle. The values of vehicle motion dynamic accelerations, for example from a vehicle motion dynamics controller, may be employed to determine and/or assess the driving state of the vehicle. The above-mentioned relatively large accelerations can be used to trigger safety system such as, for example, airbags.

A further aspect of the invention relates to a motor vehicle which comprises a sensor device of the type described above and/or an assembly of the type described above.

As has already been described above, the yaw rate, rolling rate and/or pitching rate can be detected in a motor vehicle by means of the sensor device. Inside the assembly it is possible to use, in particular, other sensor elements for detecting the longitudinal acceleration, lateral acceleration and/or vertical acceleration of the vehicle.

In particular, a vehicle motion dynamics control operation can be performed in the motor vehicle by means of the specified measurement variables in a way which is known to a person skilled in the art per se. In this context, the actual driving state of the vehicle can be described by means of the measured variables. In this context, the yaw rate of the vehicle and the longitudinal acceleration and lateral acceleration are particularly relevant for the description of the vehicle motion dynamic state of the motor vehicle. The actual driving state is usually compared with a setpoint driving state which is as a rule calculated in a model-based fashion. For this purpose, variables for example, variables can be used which can be deliberately altered by the driver, such as the wheel lock angle of steerable wheels of the vehicle and the speed of the vehicle which has been set by the driver. If the actual driving state differs in a predetermined way from the setpoint driving state, the vehicle can be stabilized by targeted interventions into the driving behavior.

In addition, rotation rates which are measured by the sensor device can be used in a vehicle occupant protection system to trigger safety means of the vehicle. In particular, in this context for example an imminent rollover of the vehicle can be detected by means of the measured rolling rate, in response to which protection systems such as a rollover bar, can be activated. This is advantageous in particular in the case of convertibles which often do not have a fixed rollover bar but instead have protection systems which are activated when required. Furthermore, the assembly can comprise one or more acceleration sensors for measuring high accelerations such as occur in the case of a collision. By means of the measurement signals of these sensors it is possible, for example, to trigger airbags or other safety systems of the vehicle in the event of a collision.

The above-mentioned advantages, and further advantages, particular features and expedient developments of the invention will also become clear by virtue of the exemplary embodiments which are described below with reference to the figures.

DETAILED DESCRIPTION OF THE INVENTION

Figure 1:
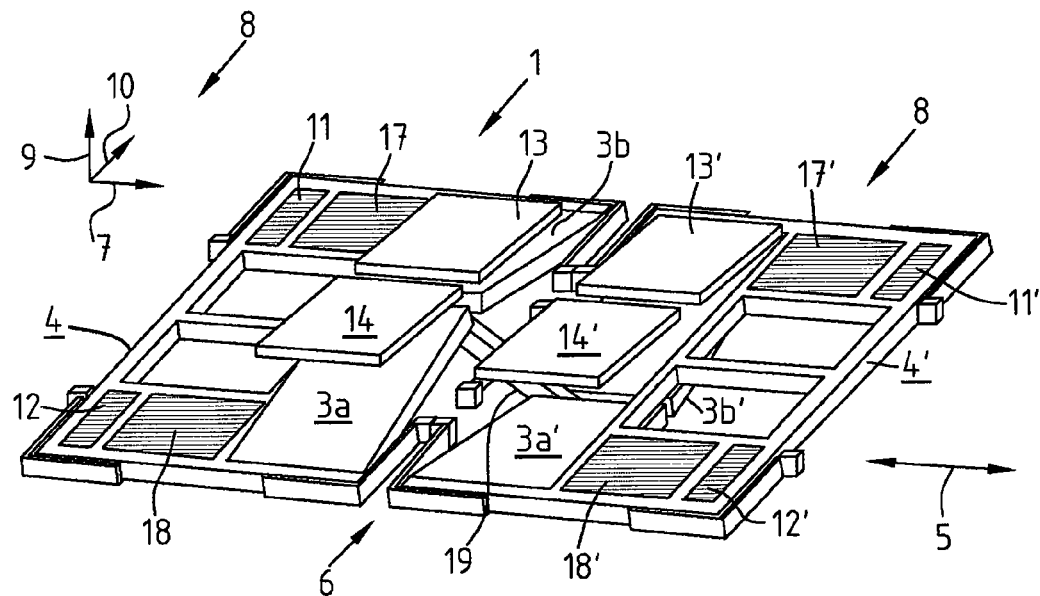
FIG. 1 is a schematic, perspective view of sensor structures of a rotation rate sensor of a sensor element which are present in duplicate and are capable of transverse oscillation.

FIG. 1 is a schematic illustration of a first sensor structure 1 of a micromechanical, dual-axis, monolithic rotation rate sensor element. The sensor structure 1 is preferably manufactured by means of micromechanical fabrication methods from crystalline silicon which is produced in the form of a wafer.

The first sensor structure 1 contains a structure frame 4 which can be made to oscillate at a predefined frequency in the drive direction 5 by a drive unit (not shown in the figure). In the exemplary embodiment shown, the drive direction 5 coincides with the x-axis 7 of a Cartesian coordinate system 8. The drive unit can operate capacitively or piezoelectrically. Furthermore, structure mass elements 3a, 3b are provided which are movably mounted on the structure frame 4. In particular, the structure mass elements 3a, 3b can, as illustrated in FIG. 1, each be mounted on one side so as to be rotatable on the structure frame 4.

In order to be able to monitor and control the oscillations of the first sensor structure 1, the first sensor structure 1 has suitable drive detection means 11 and 12. In one configuration, a capacitive drive detection is provided. In this context, drive detection means 11 and 12, which are arranged on the structure frame 4 and have, for example, a comb structure, interact with corresponding drive detection means in the manner of a capacitor whose capacitance is changed on the basis of the motion of the structure frame 4. This change is detected in order to monitor the oscillation motion. However, the drive detection can alternatively also be carried out by means of piezoelectric structures.

A Coriolis force acts on the sensor structure 1 on the basis of a rotation of the sensor structure 1 about a rotation axis 9, 10 which is oriented orthogonally to the drive direction 5.

When the sensor structure 1 rotates about a first rotation rate measurement axis which orthogonal to the drive direction 5 and which corresponds to the y-axis 10 of the illustrated coordinate system 8, a Coriolis force which points in the z direction 9 of the illustrated coordinate system 8 i.e. perpendicularly in relation to the plane of the structure frame 4, acts on the structure frame 4. This Coriolis force brings about a measurable deflection of the structure mass elements 3a, 3b in the direction of the Coriolis force. In this context, the two structure mass elements 3a, 3b are deflected in the same direction, i.e. in a common direction in relation to the plane of the frame. The deflection can in turn be detected capacitively. In this context, for example detection devices 13 and 14 interact with the structure mass elements 3a, 3b in the manner of a capacitor whose capacitance changes on the basis of the deflection of the structure mass elements 3a, 3b. This change in capacitance is determined in order to acquire therefrom the rotation rate in relation to the rotation rate measurement axis 10. Alternatively, the deflection of the structure mass elements 3a, 3b can also be detected piezoelectrically.

When the sensor structure 1 rotates about a second rotation rate measurement axis which is orthogonal to the drive direction 5 and which corresponds to the z-axis 9 of the illustrated coordinate system 8, a Coriolis force which points in the y direction 10 of the illustrated coordinate system 8, i.e. in the plane of the frame and perpendicularly to the drive direction 5, acts on the structure frame 4. The Coriolis force brings about a deflection of the structure frame 4 in the same direction, which can be detected by means of suitable detection devices 17 and 18. These can operate capacitively in one configuration and can be configured in a way analogous to the drive detection means 11, 12. In this embodiment, detection devices 17 and 18, which have, for example, a comb structure and interact with corresponding detection devices in the manner of a capacitor whose capacitance is changed on the basis of the motion of the structure frame 4, are arranged on the structure frame 4. This change in capacitance is determined in order to acquire therefrom the rotation rate in relation to the rotation rate measurement axis 9. Alternatively, the drive detection can, however, also be carried out by means piezoelectric structures.

Alternatively, the structure mass elements 3a, 3b can also be configured in such a way that their centers of gravity do not lie within the plane of the frame but rather are offset in relation to the latter in the upward or downward directions. Owing to such an arrangement of the centers of gravity of the structure mass elements 3a, 3b, a Coriolis force which is produced owing to a rotation about the rotation axis 9 brings about a deflection of the structure mass elements 3a, 3b out of the plane of the frame. However, in this case, the structure masses 3a, 3b are deflected in opposite directions in relation to one another, i.e. one structure mass element 3a; 3b is deflected upward in relation to the plane of the frame and the other structure mass element 3a; 3b is deflected downward in relation to the plane of the frame. The detection of this deflection can in turn be performed capacitively or piezoelectrically.

Preferably, in addition to the first sensor structure 1a second sensor structure 2, which is rotated through 180° in relation to the first sensor 1 and is constructed in the same way, is additionally provided. In particular, the second sensor structure 2 also contains a structure frame 4' which can be made to oscillate in the drive direction 5 by the drive unit. Deflectable structure mass elements 3a', 3b' are movably mounted on the structure frame 4'. Furthermore, drive detection means 11', 12', detection means 13', 14' for detecting a deflection of the structure mass elements 3a', 3b' perpendicularly to the plane of the frame and detection means 11', 12' for detecting deflections of the structure frame 4' in the plane of the frame perpendicularly to the drive direction 5 are also provided. The method of functioning of the specified components of the second sensor structure 2 corresponds to the method of functioning of the corresponding components of the first sensor structure 1. The sensor structures 1, 2 are coupled to one another in a connecting region 6. In particular a coupling element 19 is provided for coupling the structure mass elements 3a, 3b of the sensor structure 1 and the structure mass elements 3a', 3b' of the second sensor structure 2. Such coupling is also described, for example, in DE 10 2007 012 163 A1, to which reference is made in this respect. The coupling permits interference deflections and the excitation of undesired oscillation modes of the structure frames 4, 4' and of the structure mass elements 3a, 3b, 3a', 3b' to be avoided or reduced. Owing to the coupling, the two sensor structures 1, 2 also have the same resonant frequency and can consequently be driven by means of a common drive unit.

Figure 2:
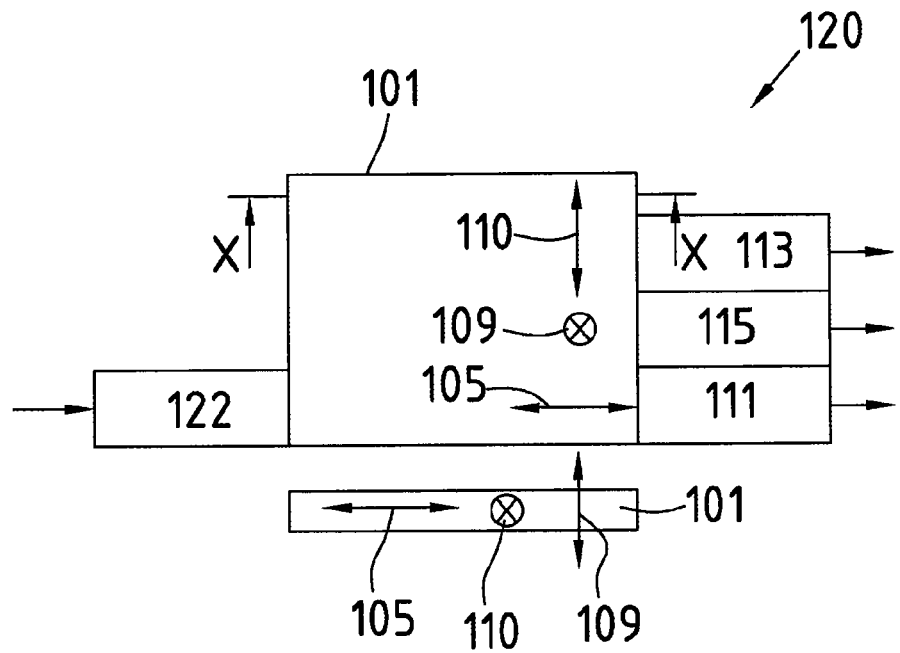
FIG. 2 is a schematic view of a simple configuration of a rotation rate sensor.

FIG. 2 shows a configuration of a single dual-axis rotation rate sensor element 120 with a sensor structure 101 of the type described above. In the rotation rate sensor element 120, the sensor structure 101 which can oscillate transversally can be made to oscillate in a drive direction 105 by means of a drive device 122. The intensity of the oscillation can be determined by means of a drive detection device 111. Deflections of the structure frames 4, 4' and of the structure mass elements 3a, 3b, 3a', 3b' in relation to two deflection directions 109, 110 perpendicularly to the drive direction 105 can be measured by means of further detection devices 113 and 115 in order to determine rotation rates which occur in the event of rotating motions of the rotation rate sensor element 120. A motion in a deflection direction 109; 110 occurs if the sensor structure 120 rotates about a rotation axis which is oriented at a right angle to the deflection direction 109; 110 and the drive direction 105. A sectional view along the sectional line X-X which illustrates further the drive direction 105 and the orthogonal deflection directions 109, 110, is also illustrated below a schematic plan view of the rotation rate sensor element 120.

Figure 3:
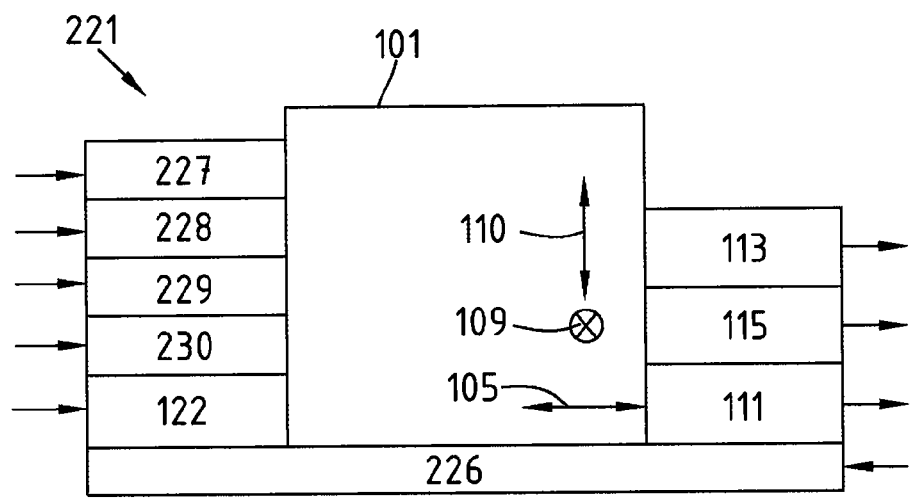
FIG. 3 is a schematic view of an extended configuration of another rotation rate sensor.

FIG. 3 is a schematic illustration of a dual-axis rotation rate sensor element 221. The latter comprises, in addition to the components of the rotation rate sensor element 120 which are described above, means 226 for suppressing crosstalk of the drive motion in the drive direction 105 onto deflections of the structure frames 4, 4' or of the structure mass elements 3a, 3b, 3a', 3b' in a deflection direction 109, 110. In particular, with these means 226 it is possible to compensate for fabrication-related deviations of the sensor structure 101 from the ideal structure. Furthermore, means 227 are provided for resetting the deflection of the structure frames 4, 4' or of the structure mass elements 3a, 3b, 3a', 3b', and means 228 are provided for regulating the frequency in terms of the deflection motions in relation to the deflection direction 109. In addition, the rotation rate sensor element 221 comprises means 229 for resetting the deflection of the structure frames 4, 4' or of the structure mass elements 3a, 3b, 3a' 3b' and means 230 for regulating the frequency in terms of the deflection motions in relation to the deflection direction 110.

Figure 4:
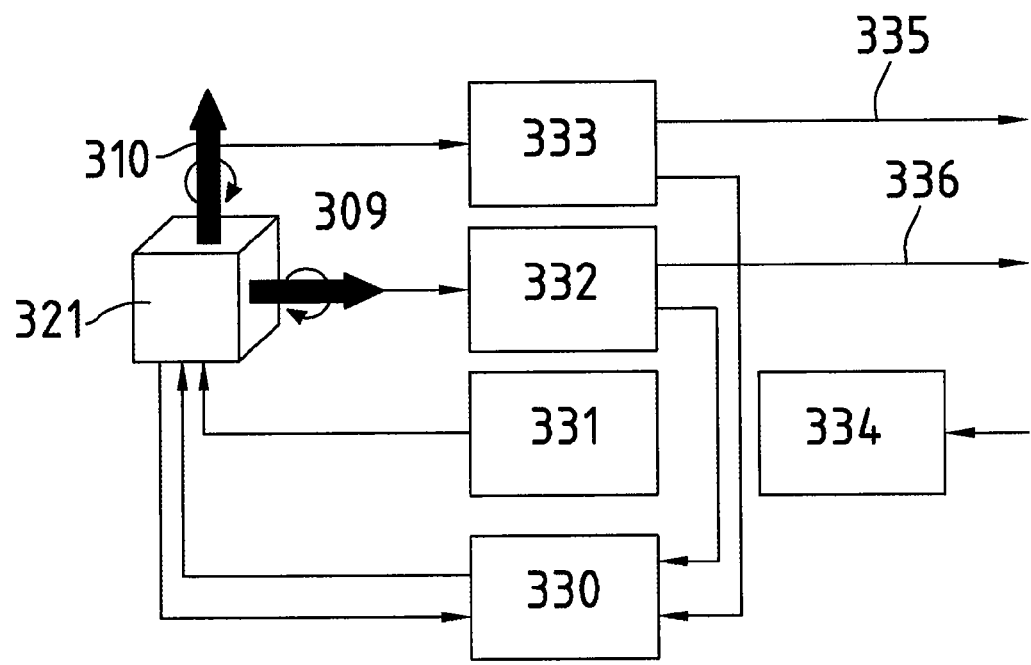
FIG. 4 is a schematic view of a rotation rate sensor according to simple configuration wiring.

FIG. 4 is a schematic block illustration of a dual-axis rotation rate sensor element 321 and of peripheral components which are used for the operation of the rotation rate sensor element 321 and for making available rotation rate measurement signals 335, 336. The rotation rate sensor element 321 is implemented in an embodiment which is described above. A measurement axis evaluation circuit 332; 333 is assigned to each rotation rate measurement axis 309; 310 of the rotation rate sensor element here. Said measurement axis evaluation circuit 332; 333 determines the rotation rate of the corresponding rotating motion on the basis of the deflection of the structure frames 4, 4' or of the structure mass elements 3a, 3b, 3a', 3b' which is detected during a rotation of the rotation rate sensor element 321 about a rotation rate measurement axis 309; 310. The rotation rates are output by the measurement evaluation circuits 332; 333 as rotation rate measurement signals 335 and 336. In addition a drive circuit 331 is provided which controls the drive of the rotation rate sensor element 321. A sensor monitoring circuit 330 is provided for monitoring the correct method of functioning of the rotation rate sensor element 321 and if appropriate acting on the drive circuit 331 and the rotation rate sensor 321. In particular, the drive frequency of the rotation sensor 321 can be adjusted by means of the sensor monitoring circuit 330 in order to set the drive frequency to a predefined value. The voltage supply of the rotation rate sensor 321 and of the peripheral components 330, 331, 332, 333 is ensured by means of a voltage supply and monitoring system 334.

In various embodiments of the invention, a dual-axis rotation rate sensor element of the type described above is combined with one or more other sensor elements. These are, in particular, other single-axis or dual-axis rotation rate sensor elements. Basically, a dual-axis rotation rate sensor element can be combined in any desired way with one or more single-axis or dual-axis rotation rate sensor elements in accordance with the purpose of use provided. Various configurations of this type will be illustrated in more detail below.

Figure 5:
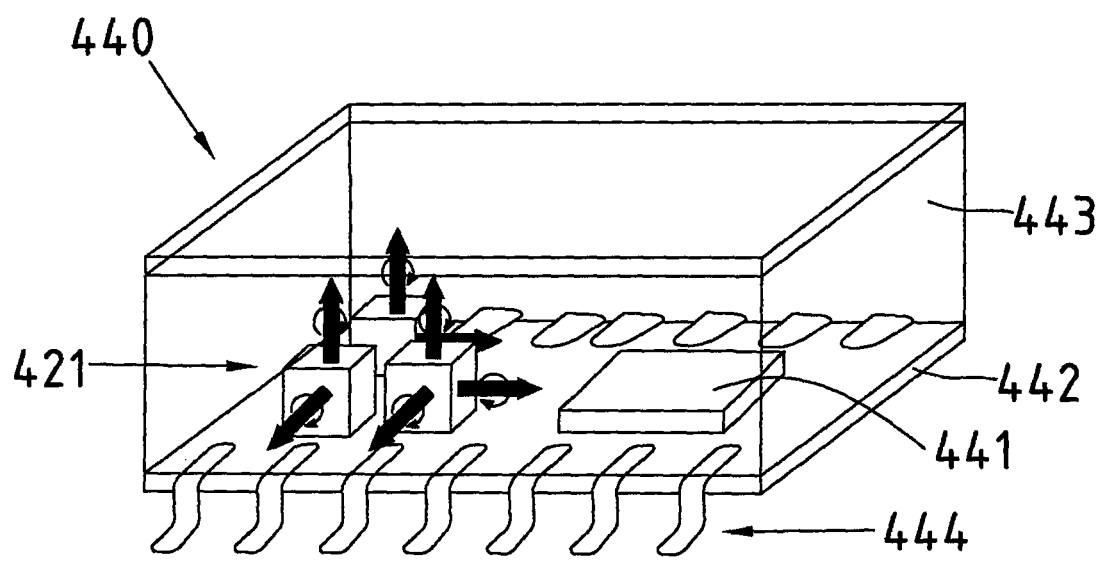
FIG. 5 is a schematic view of a first sensor element with three dual-axis rotation rate sensors, a signal processing means and a housing.

The rotation rate sensor elements can be combined here in an integrated circuit which can be used as a component in a more extensive circuit. FIG. 5 shows an integrated circuit 440 which comprises, for example, a configuration with three dual-axis rotation rate sensor elements 421 (the reference number here is only by way of example). The peripheral components of the rotation rate sensor elements 421 are integrated together into a signal processing circuit 441, which are assembled with the rotation rate sensor elements 421 on a substrate 442 in a housing 443. Alternatively, it is also possible to provide a plurality of signal processing circuits 441 which are each assigned to a rotation rate sensor element 421. The printed circuit board 442 forms a floor region of the housing 443. In the vicinity of the printed circuit board 442, electrical connections 444 are provided which extend outward beyond the housing 443. The voltage supply of the signal processing circuit 441 and of the rotation rate sensor elements 421 can be provided, and output signals of the signal processing circuit 441 made available, via the connections 444.

The integrated circuit illustrated in an embodiment in FIG. 5 can be arranged together with further components on a printed circuit board within a housing. This results in an assembly which can be used to detect rotation rates in various fields of application, for example in a motor vehicle. As an alternative to making the above available in an integrated circuit 440, the rotation rate sensor elements 421 and their peripheral components 441 can also be mounted on the printed circuit board without additional packing. The electrical connection with the printed circuit board is made here for example by means of wire bonds or flip-chip assembling processes. In addition to the rotation rate sensor elements 421 and their peripheral components 441, the assembly preferably contains a voltage supply which can be connected to a supply network and makes available the necessary operating voltage for the rotation rate sensor elements 421 and the peripheral components 441 as well as, if appropriate, other components which are present.

The equipping of the assembly with other components depends on the intended field of use. In particular, for example signal conditioning units may be provided which condition output signals of the rotation rate sensor elements 421 or of the signal processing circuit 441 for a further use. It is therefore possible, for example to provide a microprocessor which conditions output signals in such a way that they can be transmitted via a data bus. When the assembly is used in a motor vehicle, it is possible in this context for transmission to take place, for example, via a SPI, CAN or FlexRay bus. Additionally or alternatively, it is also possible, for example, to integrate radio transmission electronics into the assembly in order to be able to make available the output signals in a wireless fashion. Moreover, it is also possible to integrate into the assembly an autonomous energy supply which permits the assembly to operate over a specific time period if the external voltage supply by the supply network fails. This is of particular significance in particular in a motor vehicle in order to be able to continue to actuate safety-related functions, such as triggering of an airbag, which are based on rotation rate measurement signals, in an emergency. The autonomous energy supply comprises, for example, a battery, a capacitor or an energy transducer which acquires energy from heat, acceleration, by chemical reactions or the like.

Figure 6:
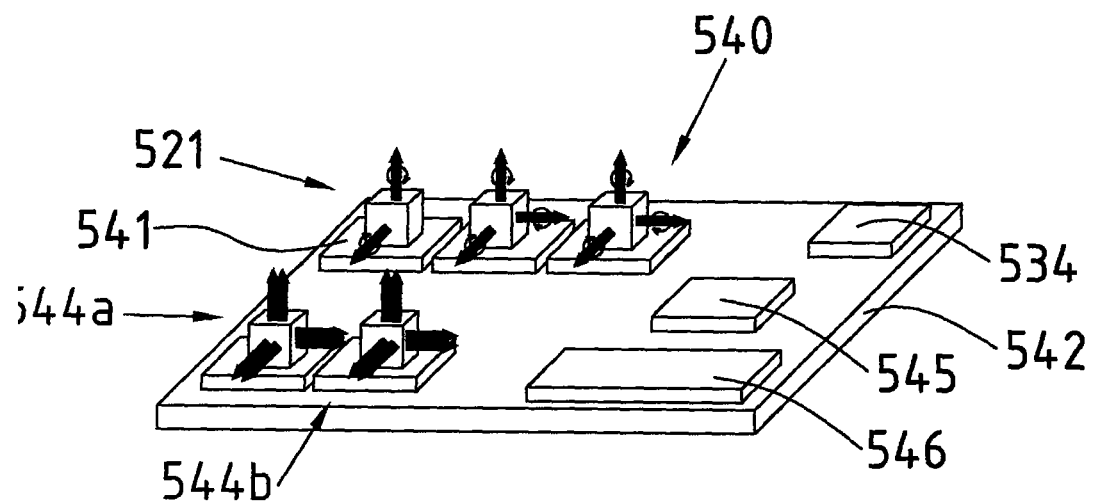
FIG. 6 is a schematic view of another sensor element with three dual-axis rotation rate sensors, two three-axis acceleration sensors and each with a signal processing means.

Furthermore, other sensor elements can be integrated together with the rotation rate sensor elements 421 into an assembly. For example, FIG. 6 illustrates an assembly 540 which provides a configuration which comprises rotation rate sensor elements 521 and provides, for example, three dual-axis rotation rate sensor elements 521 in turn. In addition, the assembly 540 contains two acceleration sensor elements 544a and 544b which are each embodied with three axes in the exemplary illustration. Each of the three dual-axis rotation rate sensor elements 521 and of the two three-axis acceleration sensor elements 544a, 544b is assigned a peripheral 541 (the reference number is only by way of example here). The individual sensor elements 521, 544a, 544b and their peripheral 541 each form a chip stack, mounted on a printed circuit board 542, in the illustrated embodiment. In addition, other components which can correspond to the components described above are additionally arranged on the printed circuit board 542. A voltage supply 534, a wireless signal transmission device 545 and a microprocessor 546 for conditioning the sensor signals are provided in the exemplary embodiment. The additional components 534, 545, 546 are utilized by all the sensor elements 521, 544a, 544b, as a result of which a high level of economic viability of the assembly 540 is achieved. The assembly 540 can in addition have a housing (not illustrated in FIG. 5) which has an external electrical connection. The assembly 540 can be connected to an energy supply network via the latter. In addition, electrical connections for exchanging data between the assembly and other systems may be provided.

The integration of acceleration sensor elements 544a and 544b is advantageous here in particular when the assembly 540 is used in a motor vehicle. In particular, in this context the acceleration sensor element 544a can be designed to detect vehicle motion dynamic accelerations along the longitudinal axis, lateral axis and vertical axis of the vehicle. These accelerations can be used to determine and evaluate the driving state of the vehicle in a vehicle motion dynamics control system. The acceleration sensor element 544b can be configured, for example, to detect large accelerations, such as occur in the case of a collision. These accelerations can be used in safety systems of the vehicle to actuate safety means such as, for example, airbags.

In further embodiments, it is possible to provide just one acceleration sensor element 544a; 544b instead of two acceleration sensor elements 544a and 544b. Furthermore, instead of one or two acceleration sensor elements 544a, 544b, or in addition, it is also possible to integrate other sensor elements into the sensor device 540. These may be, for example, one or more single-axis, dual-axis or three-axis magnetic field sensor elements which serve to determine the orientation of the assembly 540 in the earth's magnetic field. If the assembly 540 is installed in a motor vehicle, it is possible as a result to determine, for example, the orientation of the vehicle in relation to the points of the compass. This can be used to provide assistance during the determination of position and direction of travel, for example in a satellite-supported locating system.

Figure 7:
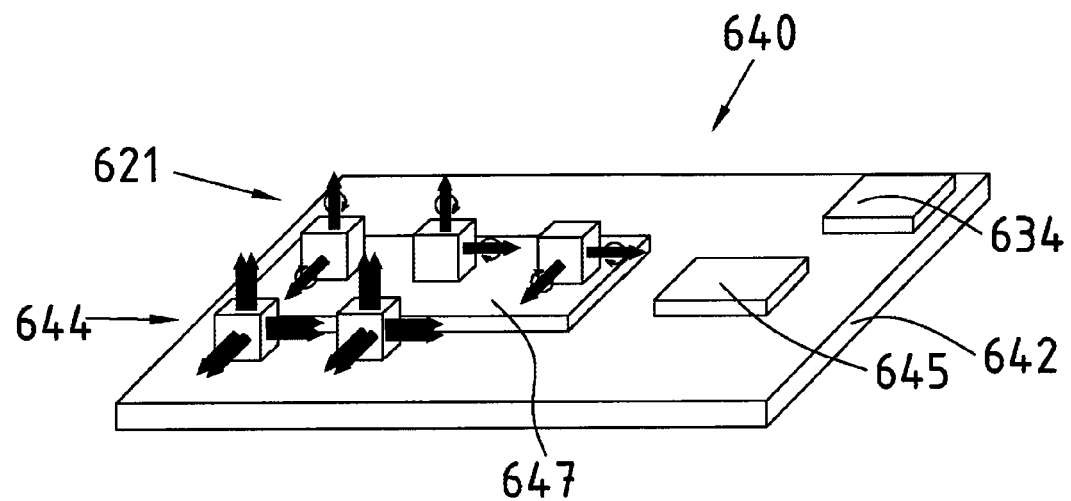
FIG. 7 is a schematic view of a further sensor element with three dual-axis rotation rate sensors, two three-axis acceleration sensors and each with a signal processing means with integrated microprocessor functions.

FIG. 7 illustrates a further assembly 640 which again contains in the embodiment shown by way of example a configuration with three dual-axis rotation rate sensor elements 621 and two three-axis acceleration sensor elements 644. In addition, other components are provided which comprise a supply voltage 634 and a wireless signal transmission device 645. The assembly 640 differs from the previously described assembly 540 in particular in that a single signal processing unit 647 is assigned to the rotation rate sensor elements 621 and the acceleration sensor elements 644, which signal processing unit 647 carries out the functions of the peripheral components of the sensor elements 621, 644a, 644b and can preferably also assume microprocessor functions. As a result, the additional microprocessor 546 which is contained in the sensor device 540 can be eliminated. In addition, the sensor element 640 can be given an overall more compact design, in particular compared directly to the sensor element 540 from FIG. 6.

Figure 8:
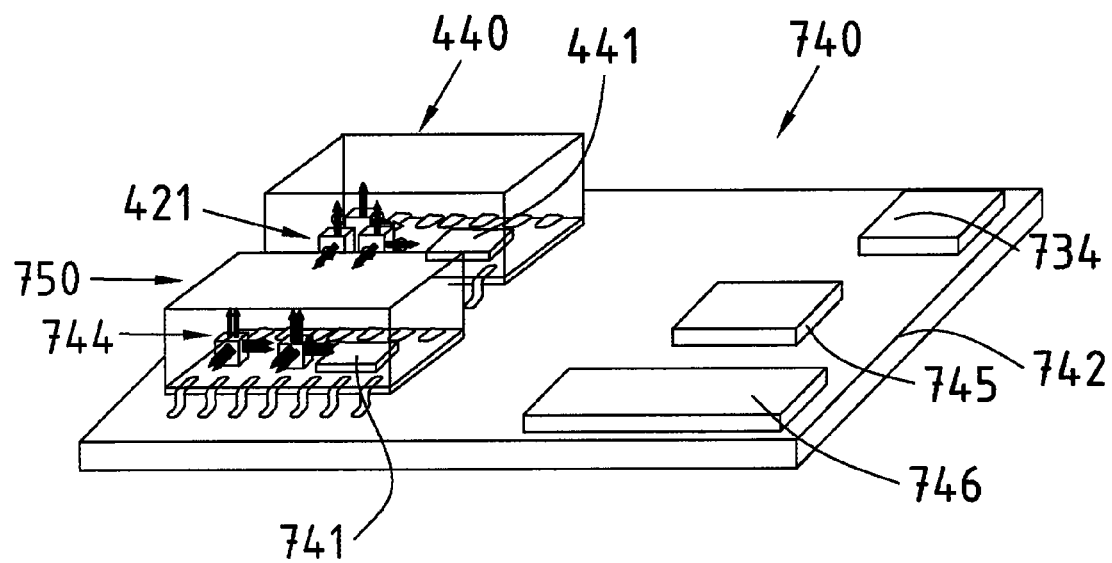
FIG. 8 is a schematic view of an additional sensor element with separately housed, dual-axis rotation rate sensors and three-axis acceleration sensors.

The assembly 740 illustrated in FIG. 8 also contains a configuration of rotation rate sensor elements, which configuration again comprises three dual-axial rotation rate sensor elements 421 in the embodiment illustrated by way of example. In addition, further sensor elements are contained which are two three-axis acceleration sensor elements 744 in the exemplary illustration. In contrast to the embodiments described above, the rotation rate sensor elements 421 are, however, combined in the integrated circuit 440 which has already been described above. Said circuit 440 is embodied in the way described above and comprises in addition to the rotation rate sensor elements 421 the peripheral components 441 of the rotation rate sensor elements 421. The acceleration sensor elements 744 are also combined, together with their peripheral 741, in an integrated circuit 750. The integrated circuits 440, 750 are themselves mounted together with further components on a printed circuit board 742. In the exemplary embodiment, the further components in turn comprise a voltage supply 734, a radio transmission circuit 745 and a microprocessor 746. The use of the integrated circuit permits in particular particularly easily mounting of the assembly 740.

An assembly of the type described above can be used, in particular, in a motor vehicle in order to determine one or more rotation rates of the motor vehicle which can be used in other systems of the motor vehicle for controlling specific functions such as, for example, a vehicle motion dynamics control system or a safety function. The rotation rates may be the yaw rate of the vehicle which is used, in particular, in vehicle motion dynamics control systems, and the rolling rate and/or the pitching rate of the vehicle. The rolling rate may be used, for example, in a safety system to detect imminent rollovers of the vehicle. For example, surroundings sensors which monitor a surrounding area in front of and/or behind the vehicle can be oriented by means of the pitching rate. In particular, given knowledge of the pitching rate, it is possible to keep the orientation of such sensors constant in relation to the roadway. The measurement signals of the further sensor elements which are contained in the assembly can also be used by other systems of the vehicle, as has already been explained above.

In addition to the rotation rates, assigned plausibility signals from which the plausibility of the detected rotation rates can be determined, can also be output on the basis of redundantly performed rotation rate measurements. The functions which use the rotation rates as input variables can be adapted by means of the plausibility signals. Given a low plausibility, it is therefore possible, for example, to attenuate interventions, or to deactivate the function completely. This permits in particular incorrect interventions to be avoided.

As already mentioned above, the combination of three dual-axis rotation rate sensor elements constitutes just one of several possible configurations with a dual-axis rotation rate sensor element and one or more further rotation rate sensor elements. In the text which follows, various possible configurations will be explained in more detail by way of example.

Figure 9:
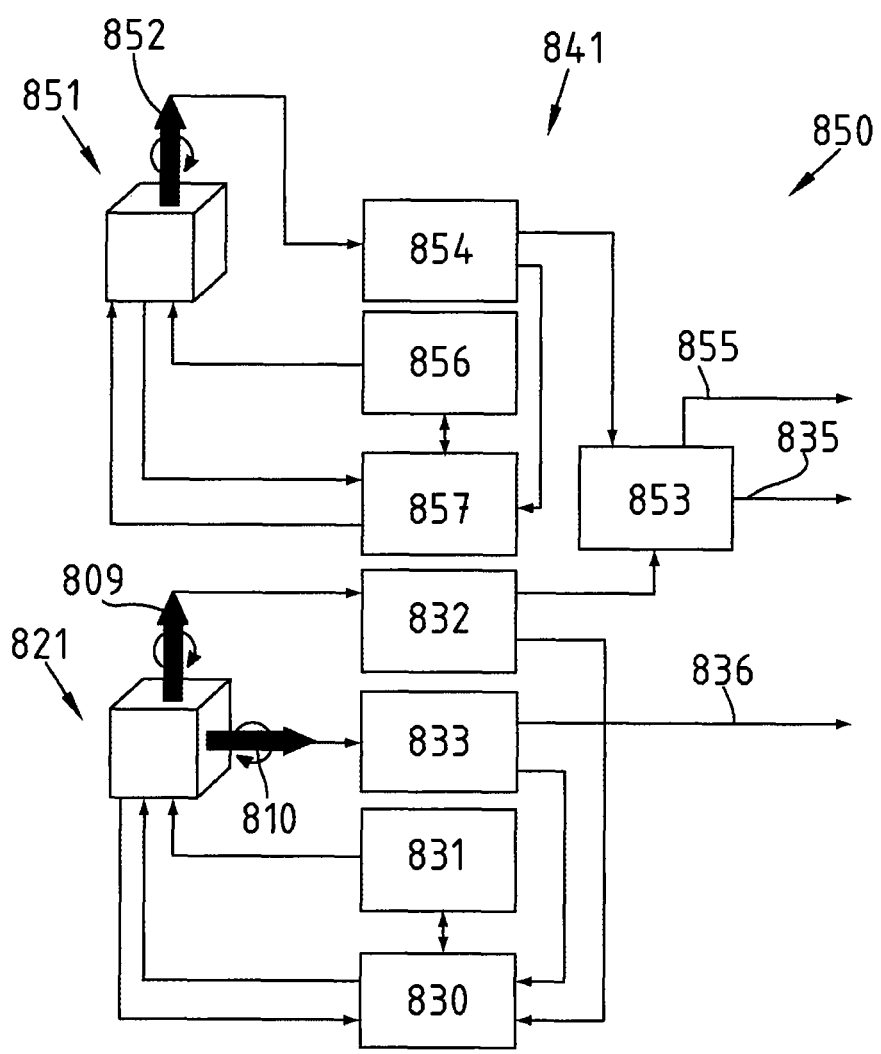
FIG. 9 is a schematic view of a first configuration of a sensor element with a single-axis rotation rate sensor and a dual-axis rotation rate sensor.

The configuration 850 illustrated schematically in FIG. 9 comprises a single-axis rotation rate sensor element 851 with a single rotation rate measurement axis 852 and a rotation rate sensor element 821 which is embodied with two axes and has two rotation rate measurement axes 809 and 810 which are oriented orthogonally to one another. The single rotation rate measurement axis 852 of the single-axis rotation rate sensor element 851 is oriented parallel to the first rotation rate measurement axis 809 of the dual-axis rotation rate sensor element 821 in order to permit redundant measurements in relation to the rotation rate about this rotation rate measurement axis 809. A peripheral 841, which comprises in each case a drive circuit 831, 856 and a sensor monitoring circuit 830, 857 for each rotation rate sensor element 851, 821, is assigned to the rotation rate sensor elements 851 and 821. In addition, a measurement axis evaluation circuit 832, 833, 854, which determines rotation rate measurement signals with respect to the corresponding rotation rate measurement axis 809, 810, 852, is provided for each rotation rate measurement axis 809, 810, 852.

In relation to the second rotation rate measurement axis 810 of the dual-axis rotation rate sensor element 821, the rotation rate measurement signal corresponds to the rotation rate output signal. The rotation rate measurement signals relating to the rotation rate measurement axis 852 of the single-axis rotation rate sensor element 851 and those relating to the first rotation rate measurement axis 809 of the dual-axis rotation rate sensor element 821 are, however, fed to a redundancy monitoring circuit 853 in which, on the one hand, a rotation rate output signal 835 and, on the other hand, a plausibility signal 855 can be generated. The rotation rate output signal 835 can be formed by means of one of the rotation rate measurement signals or by means of the two rotation rate measurement signals, for example by forming averages or also forming maximum values or minimum values. The plausibility signal 855 is preferably formed by means of the difference between the rotation rate measurement signals, and it indicates the plausibility of the associated rotation rate output signal 835.

Figure 10:
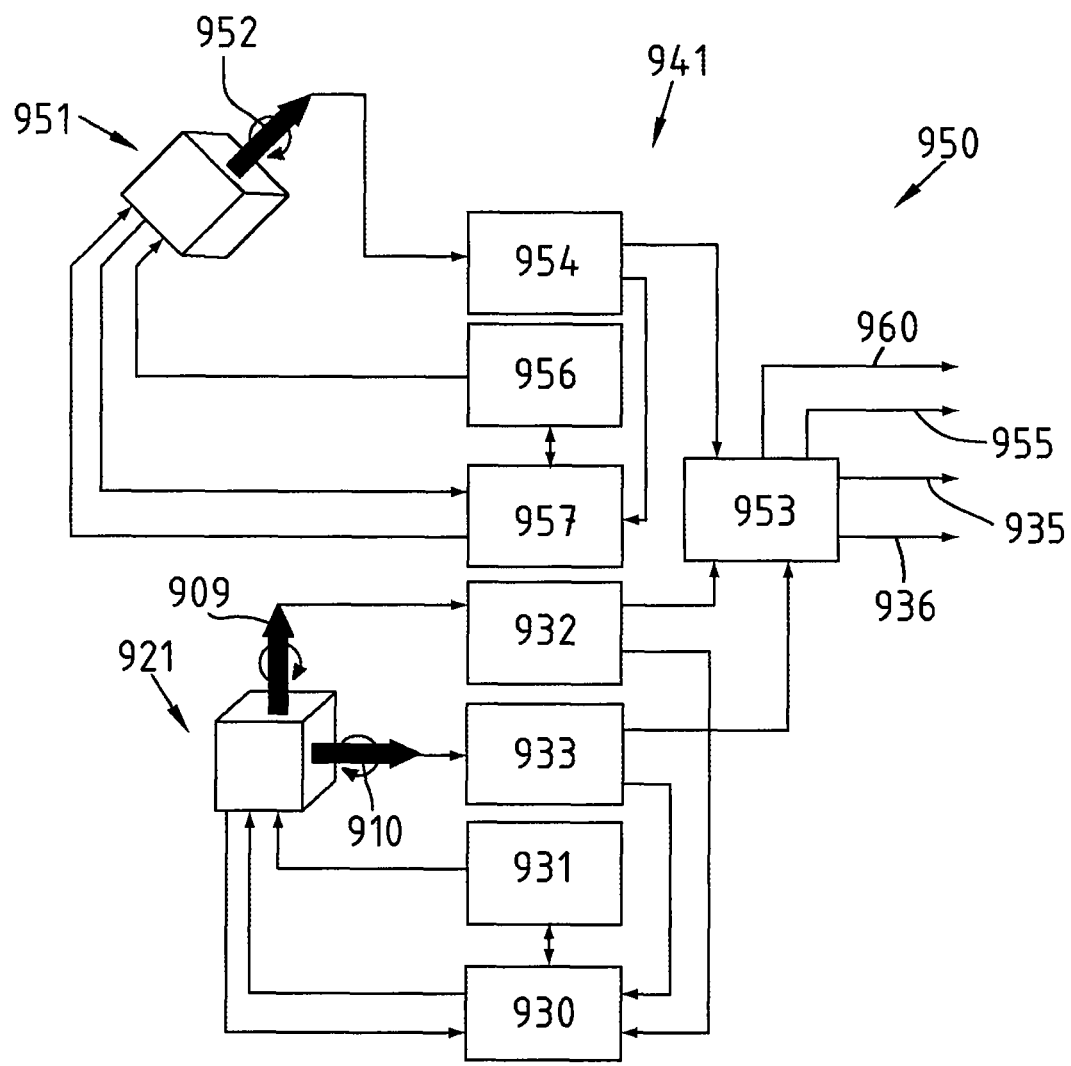
FIG. 10 is a schematic view of a further configuration of another sensor element with a single-axis rotation rate sensor and a dual-axis rotation rate sensor.

The further configuration 950 which is illustrated in FIG. 10 also comprises a single-axis rotation rate sensor element 951 with a single rotation rate measurement axis 952 and a rotation rate sensor element 921 which is embodied with two axes and has two rotation rate measurement axes 909 and 910 which are arranged orthogonally to one another. A peripheral 941 comprises in turn a first sensor monitoring circuit 930 and a first drive circuit 931 which are assigned to the dual-axis rotation rate sensor element 921, as well as a second sensor monitoring circuit 957 and a second drive circuit 956 which are assigned to the single-axis rotation rate sensor element 951. A measurement axis evaluation circuit 932, 933, 954, which determines rotation rate measurement signals relating to the corresponding rotation rate measurement axis 909, 910, 952, is respectively assigned to the rotation rate measurement axes 909, 910, 952.

The single rotation rate measurement axis 952 of the single-axis rotation rate sensor 951 lies in a plane which is defined by the two rotation rate measurement axes 909 and 910 of the dual-axis rotation rate sensor 921. However, it is not oriented parallel to the first rotation rate measurement axis 909 and also not parallel to the second rotation rate measurement axis 910 of the dual-axis rotation rate sensor 921. As a result it is possible to perform plausibility checking of the rotation rates, measured by the rotation rate sensor 921, in relation to both rotation rate measurement axes 909, 910. In the case of three rotation rate measurement axes 909, 910, 952 lying in a plane, in particular the angular speed in relation to a rotation rate measurement axis 909; 910; 952 is obtained here from a linear combination of the angular speeds in relation to the two other rotation rate measurement axes 909; 91; 952. This can be utilized to perform plausibility checking of the measured rotation rates. For example, it is possible to determine angular speeds by means of the measured rotation rates. It is then possible, for example, to compare a suitable linear combination of the angular speeds in relation to the rotation rate measurement axes 909, 910 of the dual-axis rotation rate sensor 921 with the angular speed in relation to the rotation rate measurement axis 952 of the single-axis rotation rate sensor 951. Plausibility signals can be determined in relation to the measured rotation rates from the difference.

In this respect, in the configuration 950 illustrated in FIG. 10 there is provision, in particular, that, by means of a suitable redundancy monitoring circuit 953, on the one hand a first rotation rate output signal 935 is determined in relation to the first rotation rate measurement axis 909, and a second rotation rate output signal 936 is determined in relation to the second rotation rate measurement axis 910 of the dual-axis rotation rate sensor element 921. The rotation rate output signals 935, 936 can correspond here, for example, to the associated rotation rate measurement signals. In addition, the redundancy monitoring circuit 955 determines, in the way described above, a first plausibility signal 955, assigned to the first rotation rate output signal 935, in relation to the first rotation rate measurement axis 909, and a second plausibility signal 960, assigned to the second rotation rate output signal 936, in relation to the second rotation rate measurement axis 910.

Figure 11:
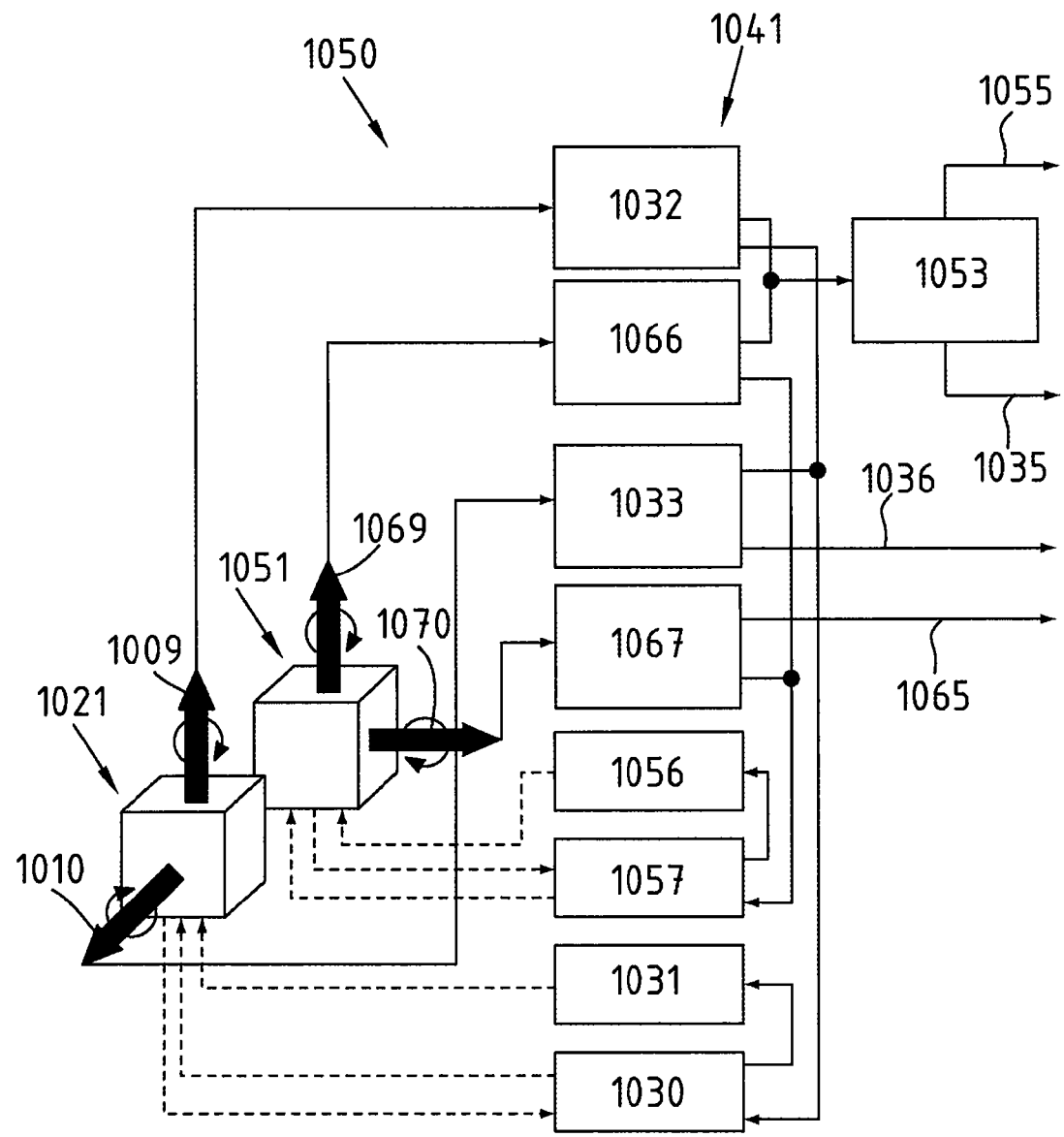
FIG. 11 is a schematic view of an additional configuration of a sensor element with two dual-axis rotation rate sensors.

FIG. 11 illustrates a configuration 1050 which comprises two dual-axis rotation rate sensor elements 1021, 1051. A peripheral 1041 comprises a first sensor monitoring circuit 1030 and a first drive circuit 1031 which are assigned to the first dual-axis rotation rate sensor element 1021, and a second sensor monitoring circuit 1057 and a second drive circuit 1056 which are assigned to the second dual-axis rotation rate sensor element 1051. The dual-axis rotation rate sensor elements 1021, 1051 have first rotation rate measurement axes 1009, 1069 which are oriented parallel to one another. Redundant rotation rate measurements can therefore be performed in relation to the parallel rotation rate measurement axes 1009, 1069. Second rotation rate measurement axes 1010, 1070 of the two rotation rate sensor elements 1021, 1051 are oriented orthogonally with respect to one another and respectively orthogonally to the first rotation rate measurement axes 1009, 1069. In each case a measurement axis evaluation circuit 1032, 1033, 1066, 1067, which determines rotation rate measurement signals in relation to the corresponding rotation rate measurement axis 1009, 1010, 1069, 1070, is assigned to the rotation rate measurement axes 1009, 1010, 1069, 1070.

The rotation rate measurement signals relating to the parallel first rotation rate measurement axes 1009, 1069 of the two rotation rate sensor elements 1021, 1051 are fed to a redundancy monitoring circuit 1053. The latter determines from the rotation rate measurement signals a rotation rate output signal 1035, relating to the rotation rate measurement axis 1009, and an assigned plausibility signal 1055. Furthermore, rotation rate output signals 1036 and 1065 relating to the other rotation rate measurement axes 1010, 1070 are made available which correspond to the rotation rate measurement signals which have been determined in relation to these rotation rate measurement axes 1010, 1070.

The configuration 1050 illustrated in FIG. 11 therefore corresponds to a sensor device which is capable of detecting rotation rates in relation to three rotation rate measurement axes 1009, 1010, 1070 which are arranged in pairs orthogonal to one another. Redundant determination of the rotation rate is possible in relation to a rotation rate measurement axis 1009.

Figure 12:
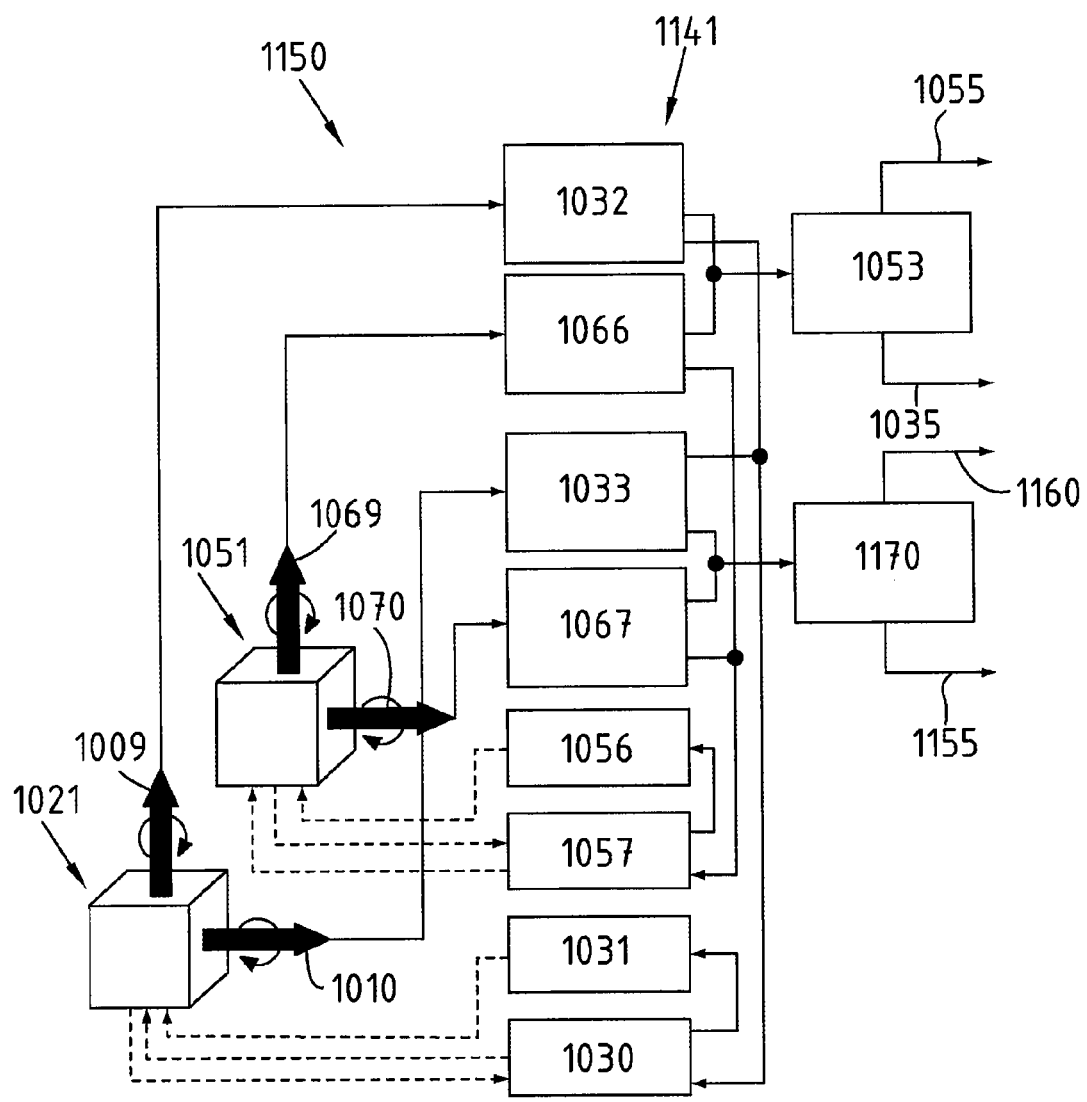
FIG. 12 is a schematic view of a configuration of a sensor element with two dual-axis rotation rate sensors and a second redundancy monitoring circuit.

The configuration 1150 shown in FIG. 12 differs from the configuration 1050 described above in that the second rotation rate measurement axes 1010, 1070 of the two rotation rate sensor elements 1021, 1051 are also oriented parallel to one another. However, they are again oriented orthogonally to the first rotation rate measurement axes 1009, 1010 of the two rotation rate sensor elements. As a result, redundant measurements of the rotation rate can be performed in relation to both rotation rate measurement axes 1009, 1010 of the first dual-axis rotation rate sensor element 1021, and corresponding plausibility signals can be determined. For this purpose, the rotation rate measurement signals which have been detected in relation to the second rotation rate measurement axes 1010, 1070 of the two rotation rate sensor elements 1021, 1051 are also fed to a redundancy monitoring circuit 1170. The latter determines from the rotation rate measurement signals a rotation rate output signal 1155 in relation to the rotation rate measurement axis 1010, and an assigned plausibility signal 1160. The rotation rate output signal 1035 and the associated plausibility signal 1055 are again made available in relation to the other rotation rate measurement axis 1009 of the first rotation rate sensor element 1021 by the redundancy monitoring circuit 1053.

The configuration 1150 which is illustrated in FIG. 12 therefore corresponds to a sensor device which is capable of detecting rotation rates in relation to two orthogonal rotation rate measurement axes 1009, 1010. Redundant determination of the rotation rate is possible in relation to both rotation rate measurement axes 1009, 1010.

Figure 13:
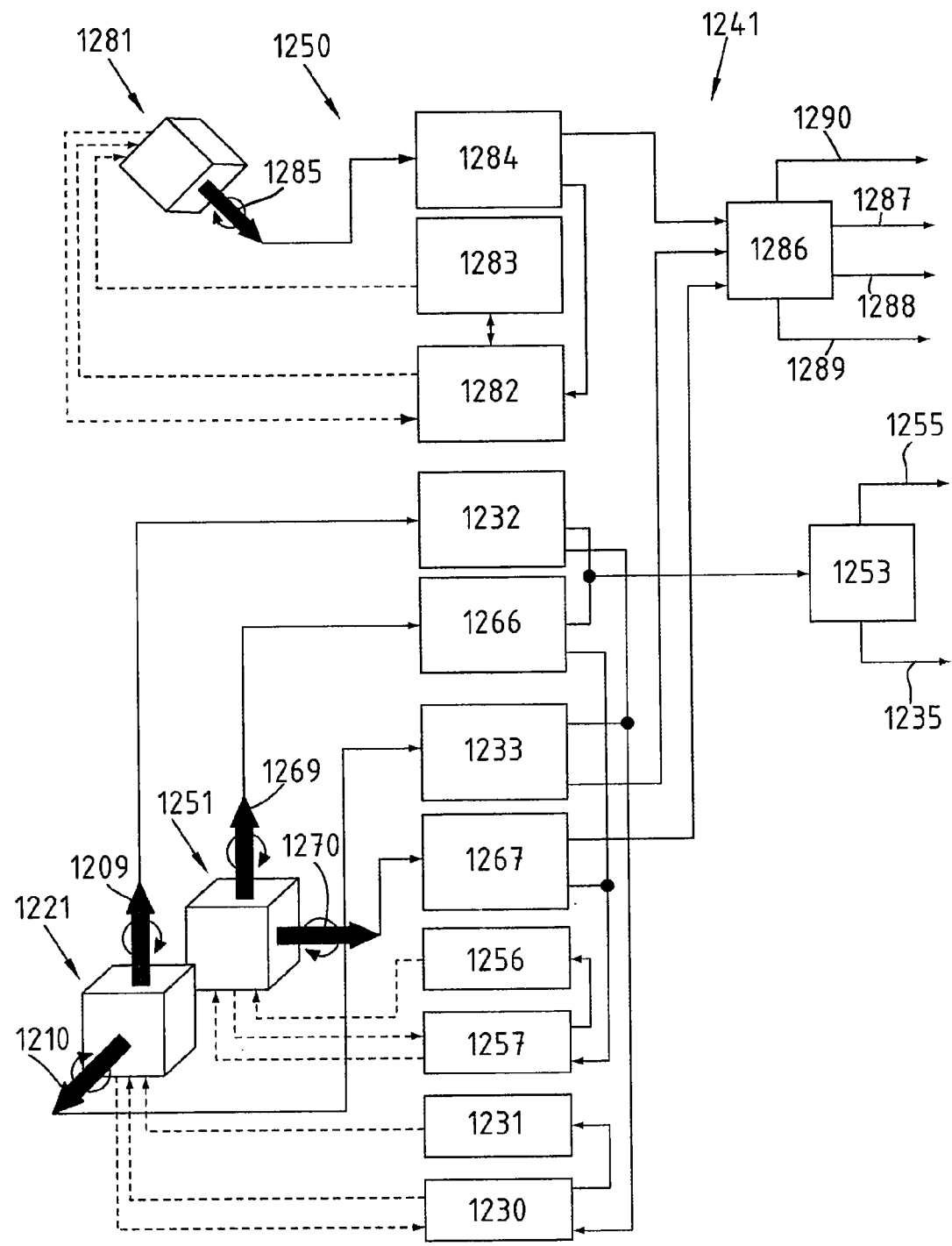
FIG. 13 is a schematic configuration of a sensor element with a single-axis rotation rate sensor and two dual-axis rotation rate sensors and a second redundancy monitoring circuit.

FIG. 13 shows a configuration with a single-axis rotation rate sensor element 1281 and two dual-axis rotation rate sensor elements 1221, 1251. A peripheral 1241 comprises a first sensor monitoring circuit 1230 and a first drive circuit 1231 which are assigned to the first dual-axis rotation rate sensor element 1221, and a second sensor monitoring circuit 1257 and a second drive circuit 1256 which are assigned to the second dual-axis rotation rate sensor element 1251.

The dual-axis rotation rate sensor elements 1221, 1251 have first rotation rate measurement axes 1209, 1269 which are oriented parallel to one another. Second rotation rate measurement axes 1210, 1270 of the two dual-axis rotation rate sensor elements 1221, 1251 are oriented orthogonally to one another and respectively orthogonally to the first rotation rate measurement axes 1209, 1269. In each case a measurement axis evaluation circuit 1232, 1233, 1266, 1267, which determines rotation rate measurement signals in relation to the corresponding rotation rate measurement axis 1209, 1210, 1269, 1270, is assigned to the rotation rate measurement axes 1209, 1210, 1269, 1270. The rotation rate measurement signals relating to the parallel first rotation rate measurement axes 1209, 1269 of the two dual-axis rotation rate sensor elements 1221, 1251, are fed to a redundancy monitoring circuit 1253. The latter determines a rotation rate output signal 1235, relating to the rotational rate measurement axis 1209, and an assigned plausibility signal 1255 from the rotation rate measurement signals.

To this extent, the configuration 1250 shown in FIG. 13 corresponds to the configuration 1050 described above and shown in FIG. 11.

However, the single-axis rotation rate sensor element 1281 is provided in addition. A sensor monitoring circuit 1282 and a drive circuit 1283 are assigned thereto within the peripheral 1241, as is a measurement axis evaluation circuit 1284 which determines rotation rate measurement signals in relation to the rotation rate measurement axis 1285 of the single-axis rotation rate sensor element 1281. The single rotation rate measurement axis 1281 of the single-axis rotation rate sensor 1281 lies in a plane which is determined by the second rotation rate measurement axes 1210, 1270 of the dual-axis rotation rate sensor elements 1221, 1251. However, it is not oriented parallel to one of the two rotation rate measurement axes 1210, 1270. As a result it is possible to perform plausibility checking of the rotation rates in relation to these rotation rate measurement axes 1210, 1270. For this purpose, the rotation rate measurement signals which are determined in relation to the rotation rate measurement axes 1210, 1270, and the rotation rate measurement signal which is determined in relation to the rotation rate measurement axis 1285 of the single-axis rotation rate sensor element 1281 are fed to a redundancy monitoring circuit 1286. The latter determines from the rotation rate measurement signals in the way described above a rotation rate output signal 1287, with respect to the rotation rate measurement axis 1210, and an associated plausibility signal 1290 as well as a rotation rate output signal 1288, with respect to the rotation rate measurement axis 1270, and an associated plausibility signal 1289.

The configuration 1250 illustrated in FIG. 13 therefore corresponds to a sensor device which is capable of detecting rotation rates in relation to three rotation rate measurement axes 1209, 1210, 1270, which are oriented in pairs orthogonally to one another. Plausibility checking of the detected rotation rates can be performed in relation to all the rotation rate measurement axes 1209, 1210, 1270. All that is necessary for this are two dual-axis rotation rate sensor elements 1221, 1251 and a single-axis rotation rate sensor element 1281.

Figure 14:
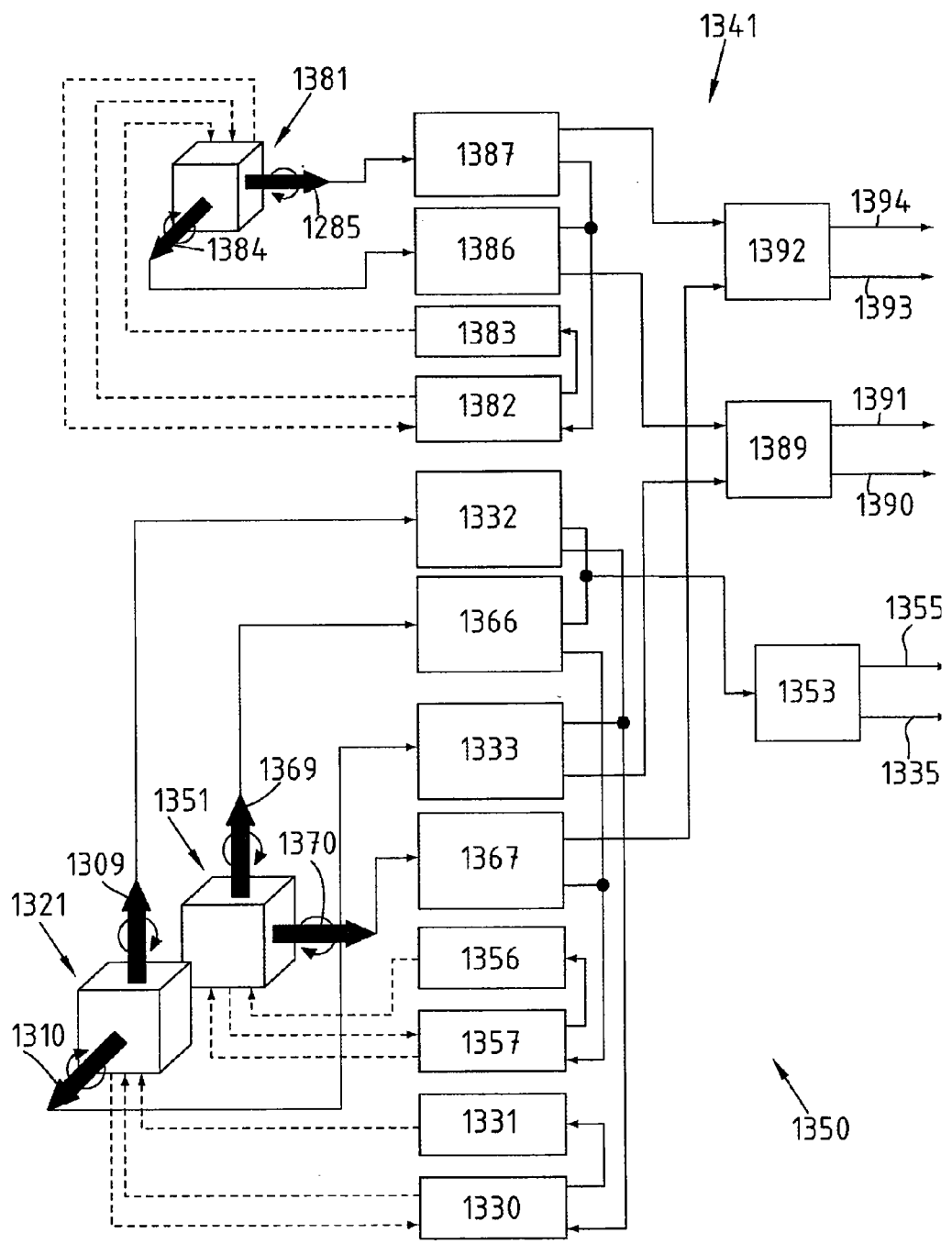
FIG. 14 is a schematic configuration of a sensor element with a single-axis rotation rate sensor and two dual-axis rotation rate sensors and three redundancy monitoring circuits.

The configuration 1350 shown in FIG. 14 comprises three dual-axis rotation rate sensor elements 1321, 1351, 1381. A peripheral 1341 comprises a first sensor monitoring circuit 1330 and a first drive circuit 1331, which are assigned to the first dual-axis rotation rate sensor element 1321, and a second sensor monitoring circuit 1357 and a second drive circuit 1356, which are assigned to the second dual-axis rotation rate sensor element 1351.

The dual-axis rotation rate sensor elements 1321, 1351 have first rotation rate measurement axes 1309, 1369 which are oriented parallel to one another. Second rotation rate measurement axes 1310, 1370 of the two dual-axis rotation rate sensor elements 1321, 1351 are oriented orthogonally to one another and respectively orthogonally to the first rotation rate measurement axes 1309, 1369. Assigned to each of the rotation rate measurement axes 1309, 1310, 1369, 1370 is a measurement axis evaluation circuit 1332, 1333, 1366, 1367, which determines rotation rate measurement signals in relation to the corresponding rotation rate measurement axis 1309, 1310, 1369, 1370. The rotation rate measurement signals relating to the parallel first rotation rate measurement axes 1309, 1369 of the two dual-axis rotation rate sensor elements 1321, 1351 are fed to a redundancy monitoring circuit 1353. The latter determines a rotation rate output signal 1335 in relation to the rotation rate measurement axis 1309, and an assigned plausibility signal 1355, from the rotation rate measurement signals.

To this extent, the configuration 1350 shown in FIG. 14 corresponds to the configuration 1050 which is described above and shown in FIG. 11.

However, the third dual-axis rotation rate sensor element 1381 is additionally provided. A sensor monitoring circuit 1382 and a drive circuit 1383 are assigned thereto within the peripheral 1341. The third dual-axis rotation rate sensor element 1381 has two orthogonal rotation rate measurement axes 1384, 1385 and measurement axis evaluation circuits 1386, 1387 which are assigned thereto and which determine rotation rate measurement signals in relation to the rotation rate measurement axes 1384, 1385. The two rotation rate measurement axes 1384, 1385 of the rotation rate sensor element 1381 are each oriented parallel to one of the second rotation axis measurement axes 1310, 1370 of the two other rotation rate sensor elements 1321, 1351. As a result, redundant measurements of the rotation rates can also be performed for these rotation rate measurement axes 1310, 1370.

The rotation rate measurement signals relating to the parallel rotation rate measurement axes 1310 and 1384 are fed to a redundancy monitoring circuit 1389 which determines a rotation rate output signal 1390, in relation to the rotation rate measurement axis 1310, and an associated plausibility signal 1391, by means of the rotation rate measurement signals. Correspondingly, the rotation rate measurement signals relating to the parallel rotation rate measurement axes 1370 and 1385 are fed to a redundancy monitoring circuit 1392, which determines a rotation rate output signal 1393, relating to the rotation rate measurement axis 1370, and an associated plausibility signal 1394 by means of the rotation rate measurement signals.

The configuration 1350 which is illustrated in FIG. 14 therefore corresponds to a sensor device which is capable of detecting rotation rates in relation to three rotation rate measurement axes 1309, 1310, 1370 which are oriented in pairs orthogonally to one another. Plausibility checking of the detected rotation rates can be performed in relation to all the rotation rate measurement axes 1309, 1310, 1370 by means of redundant detection of the rotation rates.

Although the invention has been described in detail in the drawings and in the preceding summary, the illustrations are illustrative and exemplary and are not to be understood as being restrictive; in particular, the invention is not restricted to the explained exemplary embodiments. Further variants of the invention and their implementation are evident to a person skilled in the art from the preceding disclosure, the figures and the patent claims.

Terms such as "comprise", "have", "include", "contain" and the like which are used in the patent claims do not rule out other elements or steps. The use of the indefinite article does not rule out a plurality. An individual device can carry out the functions of a plurality of units or devices which are specified in the patent claims.

The invention claimed is:

1. A sensor device in a vehicle for determining rotation rates of the vehicle, the sensor device comprising:
   a dual-axis, first rotation rate sensor element that is configured to detect rotation rates of rotating motions of the sensor device about a first and a second rotation rate measurement axis, wherein the first and the second rotation rate measurement axes are oriented orthogonally in relation to one another;
   at least one other rotation rate sensor element that is configured to detect a rotation rate of a rotating motion of the sensor device about a rotation rate measurement axis, which lies in a plane together with the first and the second rotation rate measurement axes; and
   a plausibility checking device which is configured to determine a plausibility signal based on a comparison of a first rotation rate measured by the first rotation rate sensor element and a second rotation rate measured by said at least one other rotation rate sensor element,
   wherein the first rotation rate, the second rotation rate, and the plausibility signal are used to control a driving state of the vehicle such that driving state interventions are attenuated based on the plausibility signal.

2. The sensor device as claimed in claim 1, in which the first rotation rate sensor element comprises a sensor structure which is configured to oscillate transversally and has a deflectable structure mass and a means for exciting the sensor structure which can oscillate transversally to oscillate along an oscillation axis, wherein the structure mass is configured to be deflected on the basis of Coriolis forces which occur during a rotation of the sensor device about the first and the second rotation rate measurement axes, and wherein the first and the second rotation rate measurement axes are oriented orthogonally in relation to the oscillation axis.

3. The sensor device as claimed in claim 1, wherein the plausibility checking device is configured to determine a rotation rate output signal in relation to a rotation rate measurement axis by at least a first rotation rate which is measured by the first rotation rate sensor element and a second rotation rate which is measured by said at least one other rotation rate sensor element.

4. The sensor device as claimed in claim 1, in which said at least one other rotation rate sensor element is embodied as a single-axis rotation rate sensor element that is configured to detect a rotation rate of a rotating motion of the sensor device about a third rotation rate measurement axis, which is oriented parallel to the first or the second rotation rate measurement axis.

5. The sensor device as claimed in claim 1, in which said at least one other rotation rate sensor element is embodied as a single-axis rotation rate sensor element that is configured to detect a rotation rate of a rotating motion of the sensor device about a fourth rotation rate measurement axis, which is not oriented parallel to the first or to the second rotation rate measurement axis.

6. The sensor device as claimed in claim 1, wherein said at least one other rotation rate sensor element is configured to detect rotation rates of rotating motions of the sensor device about two other rotation rate measurement axes which are oriented orthogonally to one another, wherein said at least one other rotation rate sensor element is a dual-axis rotation rate sensor element, wherein at least one of the two other rotation axes is oriented parallel to the first or the second rotation rate measurement axis.

7. The sensor device as claimed in claim 6 further comprising a single-axis rotation rate sensor element which is configured to detect a rotation rate of a rotating motion of the sensor device about a fifth rotation rate measurement axis, wherein the fifth rotation rate measurement axis lies in a plane with a rotation rate measurement axis of the first rotation rate sensor element and with a rotation rate measurement axis of said at least one other dual-axis rotation rate sensor element, which rotation rate measurement axes are not arranged parallel to one another, and wherein the fifth rotation rate measurement axis is not oriented parallel to one of these rotation rate measurement axes of the first or of the other rotation rate sensor element.

8. The sensor device as claimed in claim 7, in which a plausibility checking device is configured to determine plausibility signals relating to rotation rates which have been determined in relation to a rotation rate measurement axis lying in the plane, by means of a comparison of rotation rates which have been determined in relation to rotation rate measurement axes which lie in a plane and comprise the fifth rotation rate measurement axis.

9. The sensor device as claimed in claim 6, additionally comprising a dual-axis rotation rate sensor element, wherein each rotation rate measurement axis of one of the dual-axis rotation rate sensor elements contained in the sensor device is oriented parallel to another rotation rate measurement axis of another rotation rate sensor element of the sensor device.

10. The sensor device as claimed in claim 1, wherein the rotation rate sensor elements which are contained are assemblies of an integrated circuit.

11. An assembly for detecting at least one rotation rate, comprising:

a sensor device as claimed in claim 1, and a signal processing device which is configured to condition a rotation rate output signal and/or a plausibility signal in relation to at least one rotation rate measurement axis of the rotation rate sensor elements contained in the sensor device, in order to be made available outside the assembly.

12. The assembly as claimed in claim 11, further comprising at least one other sensor element which is coupled to the signal processing device and which is configured to detect a measurement variable which is different from a rotation rate, wherein the signal processing device is configured to make available an output signal relating to the measurement variable.

13. A motor vehicle comprising a sensor device as claimed in claim 1.

14. A motor vehicle comprising an assembly as claimed in claim 11.

* * * * *